United States Patent [19]
Kemner

[11] 3,738,441
[45] June 12, 1973

[54] SWIVEL CONTROL HANDLE FOR LIFT TRUCK

[75] Inventor: Mark H. Kemner, Park Forest, Ill.

[73] Assignee: Allis-Chalmers Corporation, Milwaukee, Wis.

[22] Filed: Mar. 6, 1972

[21] Appl. No.: 231,885

[52] U.S. Cl............... 180/19 H, 74/524, 180/65 R, 180/91, 200/153 LA
[51] Int. Cl............................................ B62d 51/00
[58] Field of Search ............ 180/19 R, 19 S, 19 H, 180/65 R, 77 R, 77 S, 91; 74/523, 524; 200/17 R, 18 153 L, 153 LA

[56] References Cited
UNITED STATES PATENTS

| | | | |
|---|---|---|---|
| 2,645,297 | 7/1953 | Wennberg et al. | 180/65 R |
| 2,792,718 | 5/1957 | Ellison | 180/19 H X |
| 2,913,062 | 11/1959 | Ulinski | 180/19 R |
| 2,918,134 | 12/1959 | Jensen | 180/19 H X |
| 2,942,679 | 6/1960 | Gibson | 180/91 |
| 3,168,156 | 2/1965 | Ulinski | 180/19 R |

FOREIGN PATENTS OR APPLICATIONS

| | | | |
|---|---|---|---|
| 778,659 | 7/1957 | Great Britain | 180/19 R |

*Primary Examiner*—Benjamin Hersh
*Assistant Examiner*—Leslie J. Paperner
*Attorney*—Charles L. Schwab, Robert B. Benson and Kenneth C. McKinett

[57] ABSTRACT

The control handle of a walkie type lift truck has an elbow part and a base part which are relatively pivotable about a longitudinal axis so as to facilitate operation of the lift truck by the operator when riding the truck. In pivoting the control handle a switch is operated to effect an inversion of the forward-reverse controls and to bypass a safety reversing switch.

8 Claims, 5 Drawing Figures

PATENTED JUN 12 1973 3,738,441

SWIVEL CONTROL HANDLE FOR LIFT TRUCK

BACKGROUND OF THE INVENTION

Heretofore, others have provided various types of controls in low lift walkie trucks which permit the operator to either walk or ride on the truck at his option. In some of these prior constructions, the control handle has two parts pivotally interconnected on an axis transverse to the longitudinal axis of the control handle so as to position the grip portion of the control handle at a convenient height and position for the operation, both in the walking position and in the riding position on the truck. The prior constructions have not been entirely satisfactory in performance, operator convenience and function.

BRIEF DESCRIPTION OF THE INVENTION

The present invention is incorporated in a low lift walkie type truck wherein the operator normally walks at the front of the truck and controls the truck through a control handle which he grips with his hands. The truck is equipped with an operator's station at the rear of the power unit where the operator may stand as he operates the truck. The bent or elbow shaped control handle is pivoted about a transverse axis, by which the handle is connected to the power unit, from a walking position to a stand-up, operator riding position. When so pivoted the direction selection of the forward and reverse switches is inverted by pivoting an elbow part of the handle 180° about the longitudinal axis of the control handle. In so pivoting about the longitudinal axis, a switch is automatically actuated to invert the forward-reverse controls so that the operator's sense of direction control based on his operation while walking the truck is the same when riding. In addition the safety switch incorporated into the control handle, which reverses the truck whenever the operator might be pinned between the handle and a wall, is bypassed when the elbow part of the handle is rotated about the longitudinal axis. The switch operated by such rotation of the elbow part of the control handle about its longitudinal axis also effects the bypassing of the safety switch.

BRIEF DESCRIPTION OF THE DRAWINGS

The present invention is illustrated by one sheet of drawings in which.

DETAILED DESCRIPTION OF THE INVENTION

Figure 1:
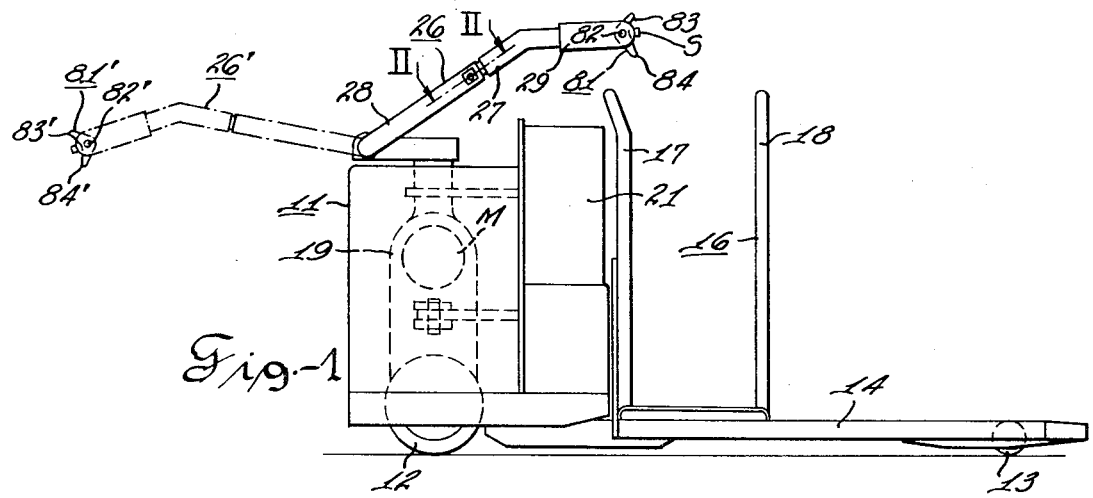
FIG. 1 is a side view of a low lift walkie truck which may be operated by a walking operator or a stand-up riding operator.

Referring to FIG. 1 the low lift walkie truck 11 includes a power unit 19 with a steerable drive wheel 12 at its forward end and a pair of load wheels 13 at its rear end. Only one load wheel 13 is illustrated. A stand-up rider's station 16, including upstanding guard rails 17, 18 is mounted on the rearwardly extending forks 14 at the rear of the power unit 19. A battery 21 supplies electric energy to the drive motor M incorporated into the power unit 19. The power unit 19 is steered and controlled by a bent control handle 26. In order that the grip portion 29 of the control handle 26 may be at the most convenient height and position for the operator in both the walking and riding positions, the handle is formed with an elbow part 27 which may be pivoted relative to a base part 28.

Figures 2, 3:
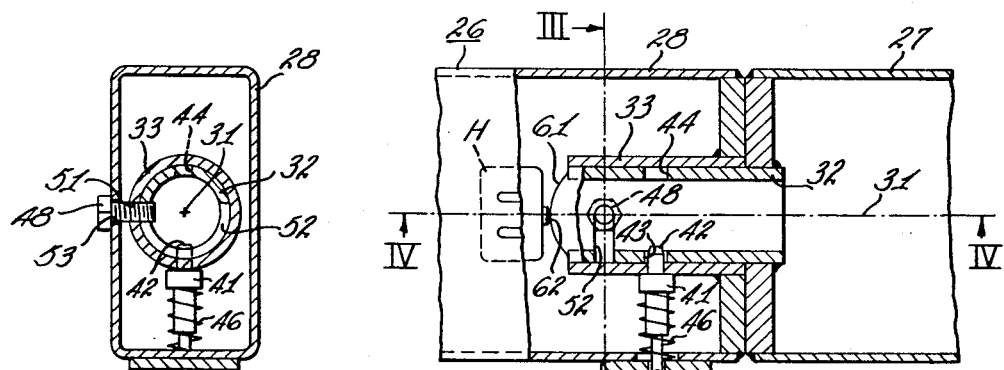
FIG. 2 is a section view taken along the line II—II in FIG. 1.
FIG. 3 is a section view taken along the line III—III in FIG. 2.
Figure 4:
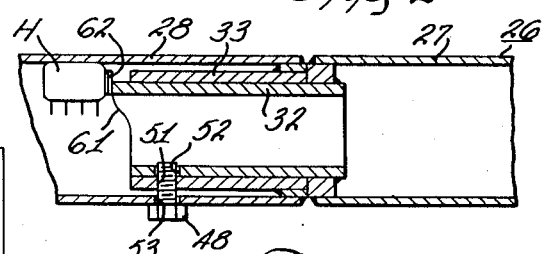
FIG. 4 is a section view taken along the line IV—IV in FIG. 2.

Referring also to FIGS. 2, 3 and 4, when the control handle 26 is in the operator riding position, as illustrated in full lines in FIG. 1, the elbow part 27 of the control handle has been rotated relative to the base part 28 180° about the longitudinal axis 31 of the control handle 26 from its walking control position shown in dash lines 26'. The pivot connection between the elbow and base parts 27, 28 is formed by a sleeve 32 of elbow part 27 which extends into and cooperativley engages a sleeve 33 of the base part 28. In order to rotate the elbow part 27 relative to the base part 28, a spring loaded locking pin 41 must first be pulled outwardly sufficient to clear the opening 43 in sleeve 32. The elbow part 27 may then be rotated 180° at which point the pin end 42 will become engageable with a diametrically opposed opening 44 in sleeve 32. A coil spring 46 surrounds the locking pin 41 and urges it upwardly as viewed in FIGS. 2 and 3. A ball-like finger grip portion 47 is in threaded engagement with the lower end of the pin 41 and is accessible to the operator so that he might selectively unlock the elbow part 27 of the control handle 26 from either of its locked positions. A cap screw 48 threadily engages a drilled and tapped opening 51 in sleeve 33 and extends into a semicircular slot 52 formed in sleeve 32. The cap screw passes through an unthreaded opening 53 in the outer wall of the base part 28. The cap screw 48 maintains the sleeves 32, 33 in assembled relationship by preventing relative axial movement even though the locking pin 41 may be retracted. The cap screw 48 and the circumferential ends of semicircular slot 52 acts as abutment means to limit the rotational movement of elbow part 27 relative to the base part 28 to approximately 180°.

Figure 5:
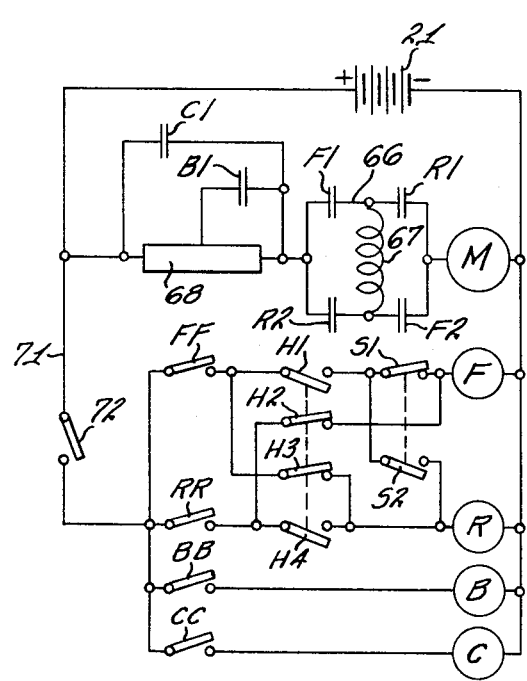
FIG. 5 is a schematic illustration of the electric control of the present invention.

Referring to FIGS. 2, 4 and 5, it will be noted that a camming portion 61 is formed on the left end of the sleeve 32 in engageable relation to the operating plunger 62 of a switch assembly H. The switch assembly H is a two pole, two throw switch having two poles or switches H1, H4 open and two poles or switches H2, H3 closed when the plunger 62 is depressed as illustrated in FIGS. 2 and 4. When the elbow part 27 of the handle 26 is rotated 180° to the position shown in dash lines 26' the plunger 62 of switch assembly H will assume an extended position in which the two switches H1, H4 are closed and the two switches H2, H3 are open.

Referring to FIG. 5, the electric control system for the illustrated walkie truck 11 is shown in part. The drive motor M of the power unit 19 is supplied with current by the battery 21 through a forward-reverse control mechanism 66 which includes a pair of forward switches F1 and F2 and a pair of reverse switches R1, R2 in conventional relationship to the motor windings 67. A resistor 68 is placed in a series with the forward-reverse control switch mechanism 66 and may be shunted in whole or in part by high speed switch C1 and intermediate speed switch B1. The forward, reverse, intermediate and high speed switches are controlled by solenoids F, R, B and C, respectively these solenoids being connected to the battery in parallel relation to one another. The solenoid control circuit 71 includes a conventional key type switch 72 and manually operated forward, reverse, intermediate speed and high speed switches FF, RR, BB and CC. The aforementioned manually operated switches are mounted on the grip portion 29 of the control handle 26. The forward and reverse operation of the truck is achieved by pivoting a butterfly lever 81 about a transverse axis 82, the lever being connected to switches FF and RR by means not shown.

It is a conventional practice in low lift walkie trucks to provide a safety button S on the end of the control handle 26 which when depressed reverses the direction of the truck by changing the motor drive from forward to reverse should the operator be backed against a wall or some other object during forward operation of the truck. The button S operates two switches S1, S2 and as illustrated the button S is in a nondepressed condition. When the button S is depressed, switch S1 is opened and switch S2 is closed, thus changing the motor drive from forward to reverse. When the control handle is in its position as shown in FIG. 1, the switch assembly H with its plunger 62 depressed will position its switches H1, H2, H3, H4 as shown in FIG. 5, in which condition the switches S1 and S2 are bypassed and of no effect on the operation of the truck. The switches S1, S2 are made inoperative because the automatic reversing feature is not needed for safe operation of the truck when the operator is riding the truck. Thus accidental reversal of the truck by depressing the button S is prevented by eliminating the switch S from the circuitry when the control handle 26 is conditioned as shown in full lines in FIG. 1. It will also be noticed that on actuation of switch assembly H by the camming portion 61, the directions effected by switches FF and RR are reversed, thus when the handle is in the position shown in FIG. 1, the closing of switch FF causes the truck to operate in reverse and the closing of switch RR causes the truck to move forward. This inversion of the forward-reverse function on pivoting the elbow part 27 of the handle 26 is desired so that the truck will move in the direction the operator is facing when he faces the handle and rotates the lever 81 upwardly, by pressing against part 83 with his thumb. Likewise as he faces the handle in either the walking or riding position and presses downwardly on part 84 of butterfly lever 81 the truck will move in the opposite direction to the direction he faces.

From the foregoing description, it is apparent that an important improvement in lift truck operation has been achieved. The control handle is bent so that when its elbow part is pivoted relative to its base part, and positioned for riding operator control, the grip portion is at a convenient height and inclination to th operator standing in station 16. However, in achieving this desired dispostion of the handle, it was found that the operators sense of direction control had been reversed. Upward movement of member 81 would still cause the truck to move to the right as viewed in FIG. 1 just as it did when so operated in the walking position, however, the operator in the riding position faces in the opposite direction he faces in the walking position. Since the operator normally operates the truck in the direction he faces (which is toward the handle), it is more natural for the operator to expect upward movement of the lever 81 to cause the truck to move in the direction he faces since this direction will be the one in which he will normally want the truck to move in going from one place to another in a materials handling operation. The present invention solves this problem in an entirely satisfactory manner by providing switch means in the form of switch assembly H to automatically invert the connections between the forward and reverse switches FF, RR and their solenoids F, R when the elbow part 27 of the handle is pivoted 180° about handle axis 31.

The embodiments of the invention in which an exclusive property or privilege is claimed are defined as follows:

1. In a walkie lift truck having a steerable power unit at its front end including a drive wheel, load wheels at its other end, and an operator's riding station at the rear of the power unit, means for controlling said truck comprising:
 a control handle including
  a base part pivotally connected to said power unit on a transverse pivot axis for swinging movement between a forwardly extending, operator walking position to a rearwardly and upwardly extending, operator riding position,
  an elbow part having a grip portion at one end, and
  means pivotally connecting said elbow part to said base part for 180° swinging movement about a longitudinal axis from a first position for walking operator operation of the truck to a second position for riding operator operation of the truck,
 forward and reverse power controls for said drive wheel including a manual control member operable to select the direction of travel, and
 inverting means automatically inverting the direction selection of said manual control member when said elbow part of said control handle is pivoted from said first position to said second position.

2. The structure of claim 1 and further comprising a safety device for changing the direction of travel from forward to reverse including an operating member on said control handle and wherein said inverting means renders said safety device inoperative when said elbow part is pivoted from said first position to said second position.

3. The structure of claim 1 and further comprising means releasably locking said elbow part in its first position and means releasably locking said elbow in said second position.

4. The structure of claim 3 and further comprising cooperating abutment means limiting relative swinging movement of said parts about said longitudinal axis to 180°.

5. The structure of claim 1 wherein said power unit includes an electric drive motor and said forward and reverse power controls include forward and reverse switches controlled by forward and reverse solenoids, respectively, first and second switches for controlling said solenoids, respectively, switch means for reversing the connection between said first and second switches and said forward and reverse solenoids when said elbow part of said handle is moved from said first position to said second position and a switch operating element on one of said handle parts operable to actuate said switch means when said elbow part is moved from said first to said second position.

6. The structure of claim 5 and further comprising safety switch means for connecting said forward switch to said reverse solenoid and disconnecting said forward switch from said forward solenoid, operating means for said safety switch including a movable element on said control handle actuated when said control handle bears against said operator in operator walking position of said handle with a predetermined thrust, and means effecting a bypassing of said safety switch when said elbow part is moved from said first to said second position.

7. The structure of claim 6 and further comprising means releasably and selectively locking said elbow part in its first and second positions.

8. The structure of claim 7 and further comprising abutment means limiting relative swinging movement of said parts about said longitudinal axis to 180°.

* * * * *